United States Patent [19]

Santi

[11] Patent Number: 4,719,682
[45] Date of Patent: * Jan. 19, 1988

[54] METHOD OF FORMING A LAMINATED WHEEL ASSEMBLY

[75] Inventor: John D. Santi, Milwaukee, Wis.

[73] Assignee: Briggs & Stratton Corporation, Wauwatosa, Wis.

[*] Notice: The portion of the term of this patent subsequent to Jun. 11, 2002 has been disclaimed.

[21] Appl. No.: 911,098

[22] Filed: Sep. 22, 1986

Related U.S. Application Data

[60] Division of Ser. No. 694,106, Jan. 23, 1985, Pat. No. 4,630,498, which is a continuation-in-part of Ser. No. 403,465, Jul. 30, 1982, Pat. No. 4,522,080.

[51] Int. Cl.$^4$ .............................................. B21K 1/30
[52] U.S. Cl. ................................. 29/159.2; 29/416; 29/525
[58] Field of Search ........................ 29/159.2, 416, 525; 74/434, 445, 449, 507

[56] References Cited

U.S. PATENT DOCUMENTS

| | | | |
|---|---|---|---|
| 281,618 | 7/1883 | Crowell | 403/359 |
| 846,549 | 3/1907 | Clark | 74/445 |
| 945,668 | 1/1910 | Alford | 29/432 |
| 1,157,666 | 10/1915 | Bennett | 29/432 |
| 1,481,212 | 1/1924 | Keller . | |
| 1,646,242 | 10/1927 | Guay et al. | 74/445 |
| 1,871,417 | 8/1932 | Mansur | 74/445 |
| 2,362,106 | 11/1944 | Unger et al. | 74/445 |
| 2,516,365 | 7/1950 | Carraher . | |
| 3,988,942 | 11/1976 | Greiner | 74/445 |
| 3,999,445 | 12/1976 | Liautaud | 74/445 |
| 4,175,404 | 11/1979 | Schopf | 403/359 |
| 4,265,388 | 5/1981 | Takahashi et al. | 29/432 |

FOREIGN PATENT DOCUMENTS

| | | | |
|---|---|---|---|
| 925262 | 7/1949 | Fed. Rep. of Germany | 74/445 |
| 3026685 | 2/1982 | Fed. Rep. of Germany | 74/445 |
| 0001924 | 1/1980 | Japan | 29/432 |

*Primary Examiner*—P. W. Echols
*Attorney, Agent, or Firm*—Andrus, Sceales, Starke & Sawall

[57] ABSTRACT

A wheel assembly includes a cam and a cam gear mounted on a camshaft of an internal combustion engine. The cam gear is constructed of a laminated stack of flat plate members which are disposed in abutting relationship to one another to form a plurality of axially spaced and radially extending interfaces. The cam gear is press fit onto the camshaft and the frictional forces between the gear and the camshaft provide the substantially sole force for maintaining the interfaces between the plate members in abutting relationship at their radially outer ends to form integral tooth members. The cam is also constructed of a laminated stack of flat plate members and press fit onto the camshaft in substantially the same manner as the gear to form an integral cam surface. The plates which form the cam are stamped from the plates that form the gear. The camshaft includes a serrated portion on its outside surface having plurality of axially extending axially tapered teeth that cut into the inner surfaces of the cam and cam gear to secure the cam and cam gear both axially and circumferentially thereon. A method of forming the wheel assembly is also disclosed.

6 Claims, 7 Drawing Figures

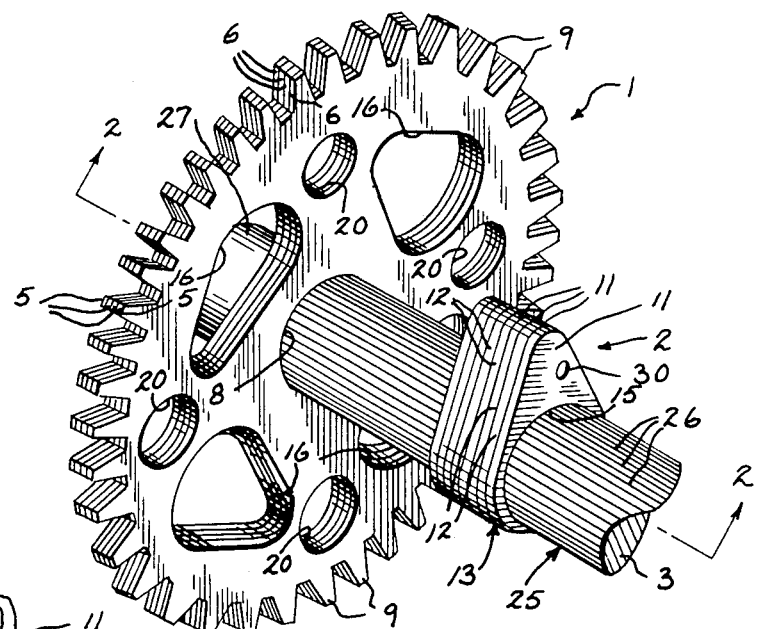
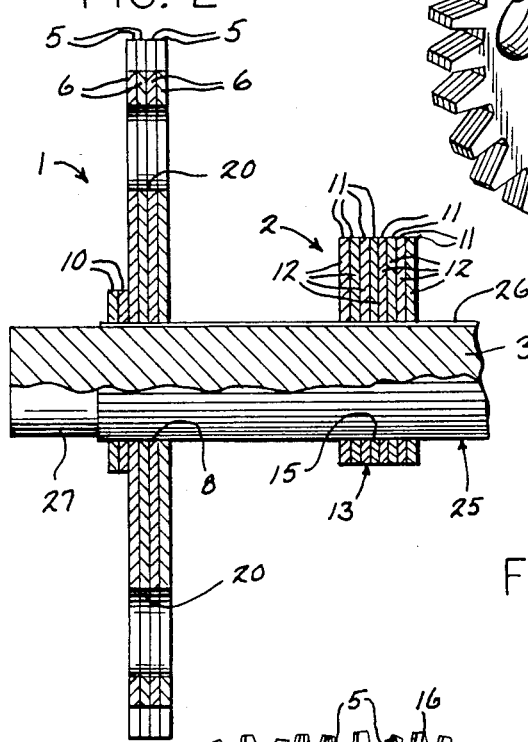
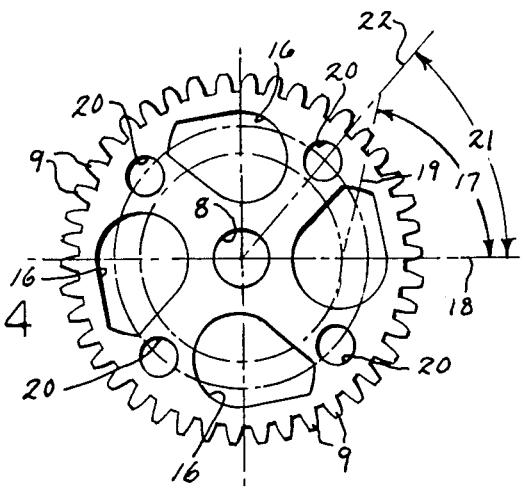
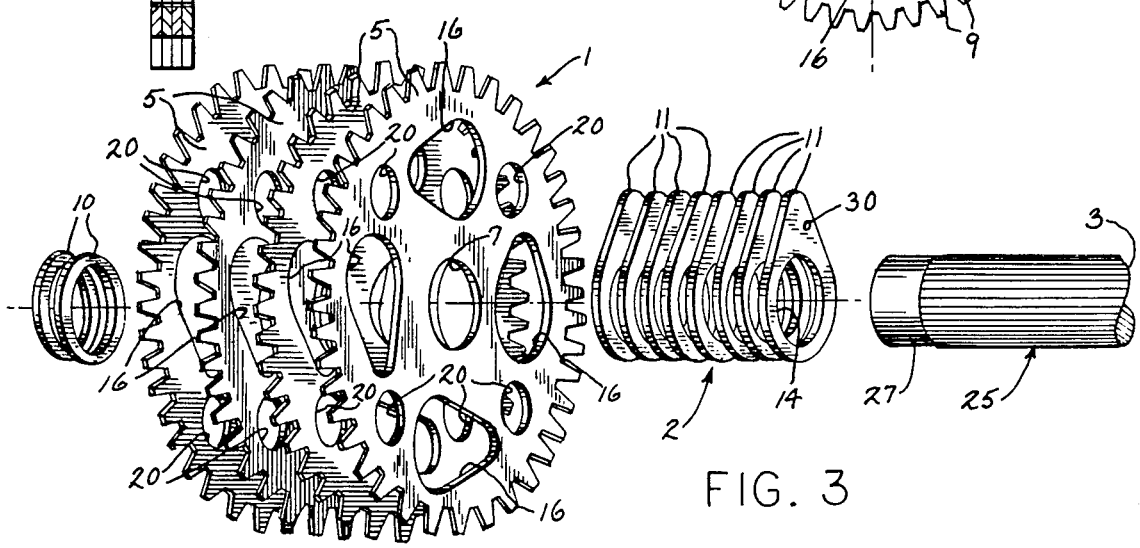
FIG. 1
FIG. 2
FIG. 4
FIG. 3

METHOD OF FORMING A LAMINATED WHEEL ASSEMBLY

CROSS REFERENCE TO RELATED APPLICATION

This application is a division of copending application Ser. No. 06/694,106, filed Jan. 23, 1985, now U.S. Pat. No. 4,630,498 which in turn is a continuation-in-part of application Ser. No. 06/403,465 filed July 30, 1982 now U.S. Pat. No. 4,522,080. Furthermore, application Ser. No. 06/707,692 filed Mar. 4, 1985, now U.S. Pat. No. 4,633,556, is a related case in that it is a division of U.S. Pat. No. 4,522,080.

BACKGROUND OF THE INVENTION

The present invention relates to wheels, and more particularly to a wheel assembly for an internal combustion engine providing a laminated cam and cam gear mounted on a camshaft.

Small internal combustion engines, such as those used on lawnmowers and snowblowers, generally include a cam gear and at least one cam mounted on a camshaft. The camshaft is rotated by means of the cam gear, which, as is conventional, meshes with a timing gear on a crankshaft to rotate in timed relation to the engine cycle. The cam may be used to control either an exhaust or an intake valve, as is also conventional.

In the past, such cams and cam gears have been formed utilizing time consuming and expensive precision machining methods. For example, such cams and cam gears are generally made by utilizing a hobbing machine to cut the gear or cam from a solid piece of metal. Hobbing cams and cam gears may also result in undesirable high waste or scrap material which further increases their cost of manufacture.

For some applications gears may be stamped from a metal blank by utilizing a punch and die arrangement. This process, however, is limited in the thickness of material that may be used, and by the strength of the material that is being used.

It is also known to use a gear formed of a laminated stack of thin gear elements, as shown in U.S. Pat. Nos. 3,999,445, 3,988,942, 2,516,365 and 1,481,212. In each of the above patents, however, the individual laminations of the gear are secured together to form a unitary structure by means of bolts, spot welds or adhesives. Such securing means not only increases the weight of the gear and thus its operational noise, but also adds to the cost of the structure.

A need has thus arisen for a cam and a cam gear structure that can be accurately produced by inexpensive stamping methods which would provide less scrap material, quieter operation and longer service life.

Various manufacturing processes are also known for assembling a camshaft, cam gear and cam. One such process involves mechanically forcing-in or pressing-in these components. However, manufacturing tolerances between the outer diameter of the camshaft and the inner diameter of the cam gear and cam may result in an improper fit. Thus, if the tolerances are too tight the cam gear or cam may crack or break during assembly, and if the tolerances are too loose the cam gear or cam may be loose on the camshaft.

It is therefore desirable to provide a mechanism that compensates for manufacturing tolerances of the components during assembly to securely mounted the components together without damaging the components during assembly.

SUMMARY OF THE INVENTION

A wheel assembly includes a rotatable shaft and a wheel fixedly secured to the shaft constructed of a laminated stack of flat plate members disposed in abutting relation to one another. The plate members are press fit onto the shaft, and the frictional force between the plate members and the shaft provides the substantially sole means for maintaining the plate members in substantially abutting relationship at their radially outer ends.

Each plate member is stamped by utilizing a punch and die arrangement from a blank of cold rolled steel having a thickness of between about 0.008 inches to about 0.125 inches. In one form, teeth may be stamped along the periphery of each plate member to form a gear when assembled into the laminate structure. In another form, the plate members may be shaped in the form of a cam of the desired configuration so that an integral cam surface is formed when the plates are assembled into the laminate structure.

Hobbing and finish machining wheels such as gears results in excessive scrap material and involves a time consuming and expensive process. In contrast, the laminated wheel of the present invention results in less scrap material and involves a relatively fast and inexpensive stamping process. In addition, hobbing and machining of prior gears involves a great amount of inspection to insure dimensional consistency and quality control. In contrast, since the individual plate members of the present invention are stamped by a die less quality control is necessary and dimensional consistencies may be more readily insured.

A laminated wheel made in accordance with the present invention also provides extended service life for structures such as gears. With a hobbed gear, the strength of the metal being hobbed must be relatively low so that the metal does not cause excessive and premature wear of the cutting tools of the hobbing machine. In contrast, however, the individual plate members of the laminated gear of the present invention are relatively thin so that they may be easily stamped or punched from a blank. As a result, the strength of the steel used for each lamination may be increased. When assembled, these laminations result in a gear that resists greater applied forces during operation.

As a cam gear, the laminated wheel of the present invention also runs quieter during operation than prior cam gears. The width of the laminated gear may be approximately one-third the width and weight of a standard hobbed gear and yet maintain the same strength. This reduced weight results in less inertia which in turn reduces noise.

It has been found that cams which are used to control either the exhaust or intake valves of small internal combustion engines may also be constructed of a laminated stack of flat plate members and be manufactured by a stamping process. In particular, the individual plates which form the laminated cam may be stamped or punched from the individual plates which form the laminated cam gear. In addition to reducing manufacturing costs, this process further reduces the weight of the gear resulting in less noise.

The wheel assembly which includes a laminated cam gear and cam is assembled by first stamping out the individual plate members which form the cam gear and cam utilizing a punch and die arrangement. During this process the individual plates which form the cam are stamped from the plates which form the cam gear. Following the stamping process, the gear and cam are positioned in axially spaced relation and the individual plates of the gear and cam are held in abutting relationship. The camshaft is then forced through their central openings to press fit the gear and cam onto the camshaft. The camshaft includes a plurality of axially extending, axially tapered serrations on its outside surface that cut into the inner surfaces of the cam and cam gear to secure the cam and cam gear both axially and circumferentially thereon. The frictional force between the gear, cam and camshaft provides the substantial sole means for maintaining the individual gear and cam plate members in substantially abutting relationship at their radially outer ends to form integral tooth members and a cam surface, respectively.

The present invention thus provides a wheel assembly having a cam gear and a cam each constructed of a laminated stack of flat members which can be accurately produced at lower cost by inexpensive stamping methods, and securely assembled together.

BRIEF DESCRIPTION OF THE DRAWINGS

The drawings illustrate the best mode presently contemplated of carrying out the invention.

In the drawings:

FIG. 1 is a perspective view of a wheel assembly showing a cam gear, cam and camshaft constituting a preferred embodiment of the present invention;

FIG. 2 is a cross-sectional side view with parts broken away taken along the plane of the line 2—2 of FIG. 1;

FIG. 3 is an exploded view in perspective showing the manner of assemblying the components of the wheel assembly of FIG. 1;

FIG. 4 is a side view in elevation of the cam gear in a reduced scale showing the position of the apertures formed therethrough;

DESCRIPTION OF THE PREFERRED EMBODIMENT

Figure 7:
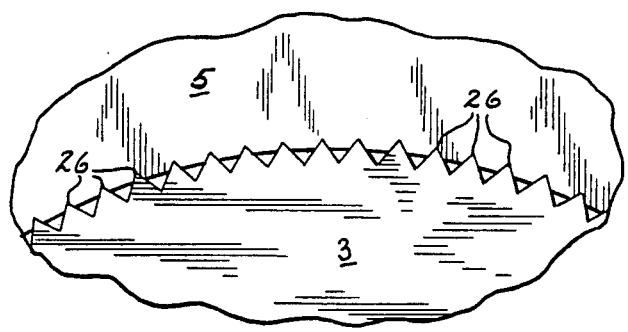
FIG. 7 is an enlarged, detailed cross sectional view illustrating the forced-in press fit assembly of the cam gear and camshaft.

Referring now to the drawings, FIG. 1 shows a wheel assembly constituting a preferred embodiment of the present invention. The wheel assembly shown in FIG. 1 is specifically adapted for use in a small internal combustion engine of the type generally utilized with lawnmowers and snowblowers. However, as is readily obvious to those skilled in the art, the wheel assembly of the present invention may be readily adapted for use with other types of internal combustion engines as well as with other types of apparatus.

The wheel assembly includes a pair of wheels, i.e. a cam gear 1 and cam 2 mounted on a camshaft 3 of an internal combustion engine. The camshaft 3 is rotated in timed relation to the engine cycle by means of cam gear 1, as is conventional, and meshes with a timing gear (not shown) on the engine crankshaft. Cam 2 may be used to control either an exhaust or an intake valve (not shown), as is also conventional. The camshaft 3 consists of a unitary member and is of circular cross section about which cam gear 1 and cam 2 are fixedly mounted.

Cam gear 1 includes a laminated stack of flat plates or gear members 5 disposed in abutting relation to one another to form a plurality of radially extending and axially spaced interfaces 6. In the particular embodiment shown in FIG. 1, the cam gear 1 includes four individual gear members 5 which thus form three interfaces 6. It is readily obvious that the number of plates or members 5 used may vary depending on the desired application. Each gear member 5 is preferably about 0.020 inches to about 0.024 inches, although the minimum thickness is about 0.008 inches and the maximum thickness is about 0.125 inches. A thickness of less than 0.008 inches provides a gear member which is too flimsy to maintain the abutting relationship along the entire radial extent of the interfaces 6. Also, beyond a thickness of about 0.125 inches the clearance between the punch and die becomes excessive and thus tolerances are lost.

As seen best in FIGS. 3 and 4, each gear member 5 includes a central opening 7 formed therethrough. When assembled the openings 7 are positioned in axial alignment to form a shaft-receiving opening 8 for frictionally receiving camshaft 3. In the embodiment shown there are forty teeth 9 on cam gear 1. However, as is readily obvious to those skilled in the art a greater or lesser number of teeth 9 may be utilized depending upon the particular use for gear 1 and the desired timing cycle for the engine.

Each gear member 5 is preferably constructed of cold rolled steel. The strength of cold rolled steel is sufficient for use in small internal combustion engines since the applied load will not exceed the yield strength of such steel. It is thus obvious to those skilled in the art that various other types of steel having various strengths may be utilized in the construction of gear members 5 as long as the applied load or applied forces are less than the yield strength of the steel so that the individual teeth of each member 5 do not flare or separate from one another.

Two annular washers 10 are also fixedly secured to camshaft 3 at a position immediately adjacent cam gear 1, as seen best in FIG. 2. The washers 10 are utilized to limit the axial play of cam gear 1 although it may not be necessary for all applications of the wheel assembly of the present invention. Washers 10 have a combined thickness slightly greater than the individual gear members 5, but less than the width of the entire cam gear 1.

The cam 2 is also fixedly secured to shaft 3 and is disposed in axially spaced relation to cam gear 1. Cam 2 is constructed in a manner similar to cam gear 1 and includes a laminated stack of plate or cam members 11 disposed in abutting relation to one another to form a plurality of radially extending and axially spaced interfaces 12. In the embodiment shown there are eight cam members 11 forming a total of seven interfaces 12 as seen best in FIG. 2. As is readily obvious to those skilled in the art, any number of cam members 11 may be utilized depending upon the desired axial thickness for cam surface 13. Each cam member 11 also includes an opening 30 formed therethrough, the purpose of which will hereinafter be understood.

Each of the plates or cam members 11 includes a central opening 14 formed therethrough. When assembled the openings 14 are positioned in axial alignment to form a central shaft-receiving opening 15 for fixedly receiving camshaft 3. The dimensions of openings 14 are formed within a tolerance of about ±0.002 inches of the diameter of cam shaft 3, as are the dimensions of openings 7 in members 5 and the annular openings in washers 10 so as to provide a tight press fit which securely holds these components on shaft 3, as will hereinafter be described.

Each individual plate or cam member 11 is stamped from one of the individual gear members 5, as shown best in FIG. 4. As shown, there are preferably four individual cam members 11 stamped from each individual gear member 5 which results in four camshaped apertures 16 formed in each gear member 5. Preferably the apertures 16 are equiangularly spaced apart with one cam-shaped aperture 16 in each of the four quadrants on the face of gear members 5. Each aperture 16 is also disposed at an angle 17 of about 77 degrees. The angle 17 is defined as the angle formed between the diameter 18 of member 5 and a line 19 which bisects aperture 16. When all of the gear members 5 are assembled to form gear 1, the cam-shaped apertures 16 are positioned in axial alignment and diametrically opposite one another to insure proper rotational balance for cam gear 1.

In order to further reduce the weight of gear 1 and thus reduce operational noise, each gear member 5 also includes a plurality of circular apertures of bores 20 formed therethrough. The bores 20 are equiangularly spaced apart and each is disposed between a pair of adjacent cam openings 16 and spaced radially outwardly from central opening 8. Each bore 20 is also disposed at an angle 21 of about 50 degrees. The angle 21 is defined as the angle formed between the diameter 18 of member 5 and a radially extending line 22 running through the center of bore 20. When gear members 5 are assembled to form gear 1, the bores 20 are positioned in axial alignment to insure proper rotational balance for gear 1.

In order to assemble cam gear 1 and cam 2 on camshaft 3 a plurality of individual gear members 5 are stamped from blank pieces of steel of the desired thickness by means of a punch and die arrangement. During this stamping process, four individual cam members 11 are stamped from each individual gear member 5, and the bores 20 are also formed. The individual gear members 5 and cam members 11 are then collected and dispensed onto a dial or support member in the thickness desired, i.e., the number of laminations desired, along with washers 10. When cam members 11 are assembled to form cam 2, openings 30 are positioned in axial alignment to insure that the outer surfaces of members 11 form the appropriate cam profile. The gear members 5, cam members 11 and washers 10 are positioned in the desired spatial relationship so that the central openings 8 and 15 are in axial alignment. The camshaft 3 may then be forced through the openings 8 and 15 and washers 10 so that the individual gear members 5 form the finished gear 1 and the individual cam members 11 form the finished cam 2. The gear 1 and cam 2 are thus tightly press fit onto shaft 3.

It has been unexpectedly found that the frictional forces between the individual gear members 5 and the shaft 3 provides substantially the sole means necessary for maintaining the members 5 in substantially abutting relationship throughout their radial extent. Unlike prior structures the present assembly eliminates the need for utilizing bolts, spot welding, adhesives or the like to maintain the interfaces 6. As long as the applied load does not exceed the yield strength of the steel utilized in forming gear 1, the members 5 will remain in abutting relation to form the integral teeth 9. The cam 2 may likewise be constructed to form the cam surface 13.

Figure 6:
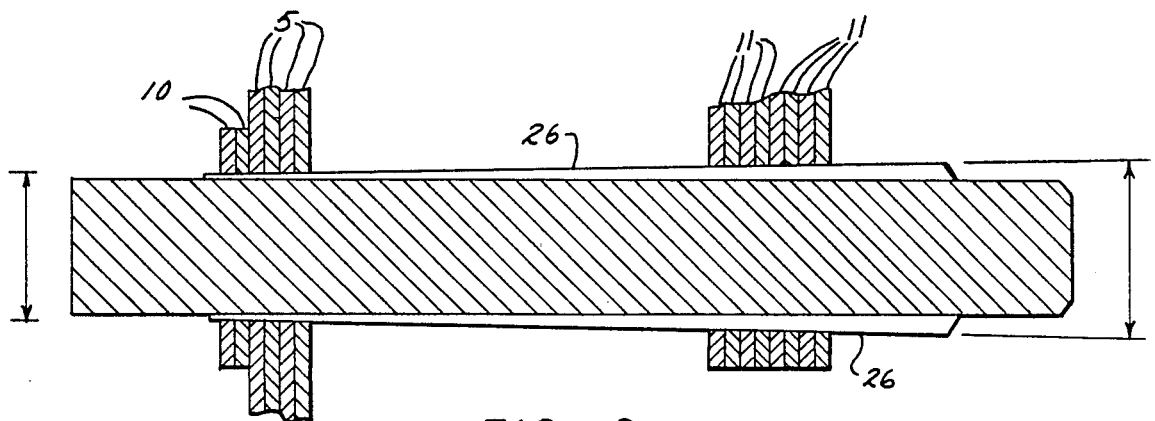
FIG. 6 is an enlarged, detailed, cross sectional side view in elevation of the wheel assembly.
Figure 5:
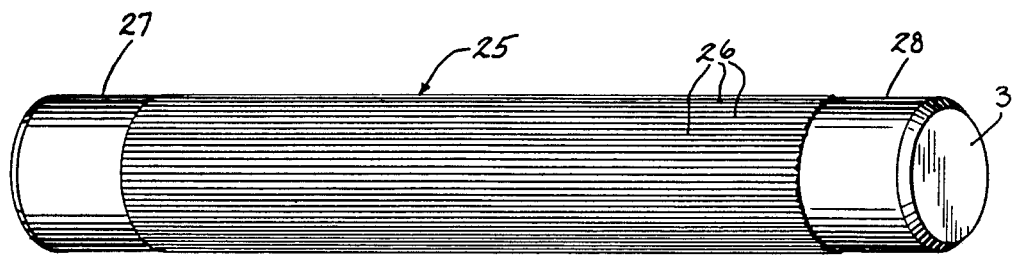
FIG. 5 is an enlarged perspective view of the camshaft of the wheel assembly.

In order to insure an extremely secure assembly, cam gear 1, cam 2 and washers 10 are assembled upon camshaft 3 by the press-fit or forced-in assembly shown in FIGS. 5–7. FIG. 5 is an enlarged view of camshaft 3 illustrating that camshaft 3 has a serrated outer surface 25 forming a plurality of circumferentially disposed axially extending teeth 26. Teeth 26 begin at a first location spaced from one end of crankshaft 3 and terminate at a second location spaced from the other end of shaft 3 to form smooth end portions 27 and 28. End portions 27 and 28 are utilized for journalling shaft 3 in the walls of an engine block in any conventional manner.

FIG. 6 schematically illustrates on an enlarged scale two teeth 26 positioned diametrically opposite one another. As shown, each tooth 26 is tapered in an axial direction upwardly from end portion 27 toward end portion 28, and rises 0.001–0.002 inches along its axial length. The inclination or taper of teeth 26 function to compensate for or take up manufacturing tolerances between shaft 3 and cam gear 1, cam 2 and washers 10. Without these tapered teeth 26 it has been found that cam gear 1, cam 2 and washers 10 may crack or break during assembly onto shaft 3 due to the manufacturing tolerances being too tight. Alternately, if the tolerances are too loose cam gear 1, cam 2 and washers 10 may be loose on shaft 3. Thus, the present components need not be manufactured to extremely high tolerances permitting less expensive manufacturing methods to be employed.

In order to insure proper assembly of all components, the initial portions or starting portions of teeth 26 adjacent end portion 27 are heat hardened by any conventional method, such as carbon nitride induction. Alternately, the entire axial length of teeth 26 may be hardened if desired. Hardening of teeth 26 prevents deformation of their cutting points or edges as this portion of teeth 26 pass through cam 2 during assembly. Thus, teeth 26 maintain their shape so that they may cut into or interfere with cam gear 1 and washers 10 in the manner shown in FIG. 7. If teeth 26 were not hardened, teeth 26 would deform as they pass through cam 2 with the result that teeth 26 may not properly cut into cam gear 1 and washers 10 to secure these two components both axially and circumferentially on shaft 3.

It has also been found necessary to provide a plurality of circumferentially disposed teeth 26 along the serrated outer surface of shaft 3. One, two, three or four teeth 26 equiangularly spaced about shaft 3 distorts the shape of the profile of cam 2 when cam 2 is assembled or fit onto shaft 3. Therefore, substantially the entire outer surface of shaft 3 needs to be serrated.

After assembly and while cam gear 1 is on shaft 3, the teeth 9 of cam gear 1 are broached or recut to remove a portion of the metal from the outside surfaces thereof. This is necessary to eliminate the shear and break effect along the tooth surfaces which occurs when the individual gear members 5 are stamped by means of a punch and die arrangement. Without broaching, the shear and break tooth surfaces of gear members 5 act like a file to abrade against the tooth surfaces of adjacent gear members and wear out the teeth. Therefore, broaching eliminates any shear and break surfaces to provide a better surface finish and shapes teeth 9 so that they are concentric about shaft 3.

A wheel assembly for an internal combustion engine has been shown and described which includes a cam gear 1 and cam 2 constructed of a laminated stack of flat plate members 5 and 11, respectively. The frictional forces between the gear 1, cam 2 and the teeth 26 on camshaft 3 provide the substantial sole means for maintaining the individual members in substantially abutting relationship at their radially outer ends. Although specifically described with respect to small internal combustion engines, the principles of the present invention may be utilized with other types of wheel assemblies. In addition, the number and thickness of each individual lamination making up gear 1 and cam 2 may vary depending upon the desired application.

I claim:

1. A method of forming a wheel assembly, comprising the steps of:

stamping a plurality of plates of desired configuration each provided with an opening formed therethrough;

forming teeth along the periphery of each plate;

stamping apertures in said plates in the shape of a cam to provide a plurality of cam members;

assembling the plates into a laminated stack so that adjacent plates are in abutting relation to one another with their openings in register and so that the teeth of adjacent plates are in registry to provide a laminated gear;

stamping an opening in each cam member;

assembling the cam members into a laminated stack so that adjacent cam members are in abutting relation to one another with their openings in registry to form an integral cam surface;

positioning said laminated stack of cam members in spaced relation to said laminated gear;

providing a shaft having a plurality of axially extending, axially tapered, radially projecting teeth disposed circumferentially about substantially the entire outer surface of said shaft; and forcing said shaft through said openings so that the teeth of said shaft cut into said plates to secure said plates against both axial and circumferential movement relative to said shaft and so that said stack of cam members is forced onto said shaft at substantially the same time as said gear.

2. The method of claim 1, wherein each of said plates have a thickness of between about 0.008 inches and about 0.125 inches.

3. The method of claim 1, wherein each of said plates have a thickness of about 0.020 inches to about 0.024 inches.

4. The method of claim 1, wherein a plurality of said apertures are stamped in each plate at locations equiangularly spaced apart from one another.

5. The method of claim 4, further including the step of stamping a plurality of bores in each of the plates of said gear at circumferentially spaced apart locations between said apertures.

6. The method of claim 1, further including the step of heat treating at least a portion of said axially extending teeth to harden said teeth.

* * * * *

UNITED STATES PATENT AND TRADEMARK OFFICE
CERTIFICATE OF CORRECTION

PATENT NO. : 4,719,682
DATED : January 19, 1988
INVENTOR(S) : John D. Santi

It is certified that error appears in the above-identified patent and that said Letters Patent is hereby corrected as shown below:

Col. 3, line 36, Delete "assemblying" and substitute therefor ---assembling---

Col. 5, line 1, Delete "+0.002" and substitute therefor ---$\pm 0.00\overline{0}2$---

Col. 5, line 26, Delete "of", second occurrence, and substitute therefor ---or---

Signed and Sealed this

Twenty-seventh Day of September, 1988

Attest:

DONALD J. QUIGG

*Attesting Officer*     Commissioner of Patents and Trademarks